US007663352B2

(12) United States Patent
Yang et al.

(10) Patent No.: US 7,663,352 B2
(45) Date of Patent: Feb. 16, 2010

(54) CONTROL CIRCUIT FOR MEASURING AND REGULATING OUTPUT CURRENT OF CCM POWER CONVERTER

(75) Inventors: Ta-yung Yang, Milpitas, CA (US); Chuh-Ching Li, Taoyuan County (TW); Feng-Cheng Tsao, Pingtung County (TW)

(73) Assignee: System General Corp., Taipei Hsien (TW)

( * ) Notice: Subject to any disclaimer, the term of this patent is extended or adjusted under 35 U.S.C. 154(b) by 298 days.

(21) Appl. No.: 11/845,261

(22) Filed: Aug. 27, 2007

(65) Prior Publication Data
US 2009/0058389 A1 Mar. 5, 2009

(51) Int. Cl.
*G05F 1/00* (2006.01)
*H02M 7/44* (2006.01)
*H02M 3/24* (2006.01)

(52) U.S. Cl. .......................... 323/271; 323/284; 363/97

(58) Field of Classification Search ............... 363/21.1, 363/21.16, 21.17, 21.18, 21.13, 21.05, 21.08, 363/21.09, 97, 131; 323/241, 242, 246, 282, 323/283, 285, 288, 301, 314–317, 271, 284; 327/392, 393, 396, 548
See application file for complete search history.

(56) References Cited

U.S. PATENT DOCUMENTS 5,335,162 A * 8/1994 Martin-Lopez et al. ....... 363/97

| 5,440,306 A  | * | 8/1995 | Tatsumi ..................... 341/150 |
| 5,903,452 A  |   | 5/1999 | Yang |
| 6,344,983 B1 | * | 2/2002 | Glennon ................... 363/21.12 |
| 6,385,059 B1 | * | 5/2002 | Telefus et al. ............ 363/21.15 |
| 6,744,224 B2 | * | 6/2004 | Ishii ........................... 315/291 |
| 7,016,204 B2 |   | 3/2006 | Yang et al. |
| 7,061,225 B2 |   | 6/2006 | Yang et al. |

* cited by examiner

*Primary Examiner*—Jessica Han
*Assistant Examiner*—Emily Pham
(74) *Attorney, Agent, or Firm*—J.C. Patents

(57) ABSTRACT

A switching control circuit is provided for measuring and regulating an output current of a power converter. The power converter is operated under continuous current mode. A detection circuit generates a continuous-current signal and a peak-current signal by detecting a switching current of an inductive device. An integration circuit generates an average-current signal in response to the continuous-current signal, the peak-current signal and an off time of a switching signal. The switching control circuit generates the switching signal in response to the average-current signal. The switching signal is coupled to switch the inductive device and regulate the output current of the power converter. A time constant of the integration circuit is correlated to the switching period of the switching signal, therefore the average-current signal will be proportional to the output current.

12 Claims, 5 Drawing Sheets

CONTROL CIRCUIT FOR MEASURING AND REGULATING OUTPUT CURRENT OF CCM POWER CONVERTER

BACKGROUND OF THE INVENTION

1. Field of the Invention

The present invention relates to a power converter, and more particularly, to a control circuit of the power converter.

2. Description of Related Art

Various power converters have been widely used to provide regulated voltage and current. In order to reduce the device count and cost of the power converter, primary-side control technologies have been proposed, such as "Close-loop PWM controller for primary-side controlled power converters" by Yang, et al., U.S. Pat. No. 7,016,204; and "Apparatus and method thereof for measuring output current from primary side of power converter" by Yang, et al., U.S. Pat. No. 7,061,225, etc. However, these prior arts are developed for operating under discontinuous current mode (DCM), which may lower the power efficiency of the power converter. The illustration of the discontinuous current mode and continuous current mode (CCM) can be found in the "Adaptive slope compensator for current mode power converters" by Yang, U.S. Pat. No. 5,903,452.

It is hence important to develop an output current control circuit that can be operated at continuous current mode for achieving higher power efficiency of the power converter.

SUMMARY OF THE INVENTION

The present invention provides a control circuit for measuring and regulating an output current of a power converter which is operated in the continuous current mode. A detection circuit generates a continuous-current signal and a peak-current signal by detecting a switching current of a transformer. An integration circuit generates an average-current signal in response to the continuous-current signal, the peak-current signal and the off time of a switching signal. A switching control circuit is utilized to generate the switching signal in response to the average-current signal. The switching signal is coupled to switch the transformer and regulate the output current of the power converter. The switching control circuit further includes an oscillator to generate an oscillation signal for determining a switching frequency of the switching signal. A time constant of the integration circuit is correlated with the switching period of the switching signal.

DESCRIPTION OF THE EMBODIMENTS

Figure 1:
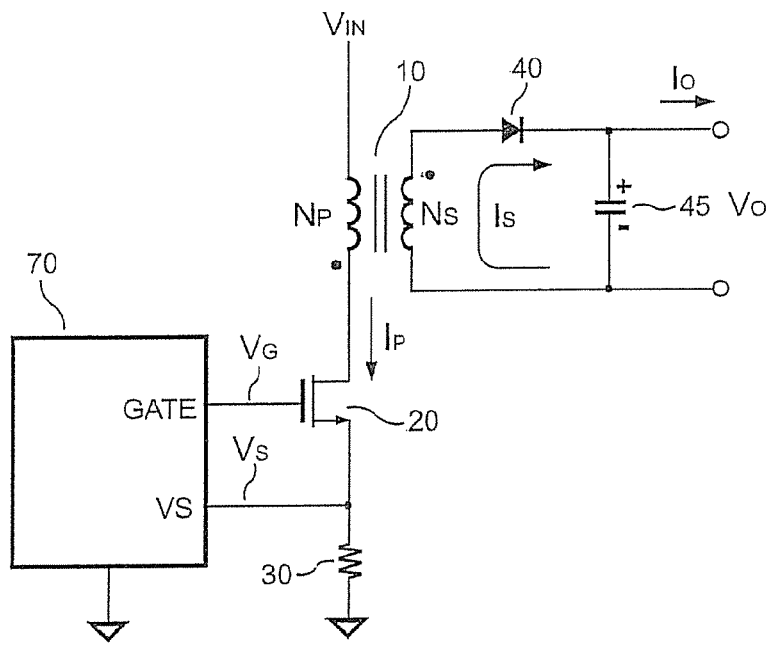
FIG. 1 illustrates a schematic diagram of a power converter.
Figure 2:
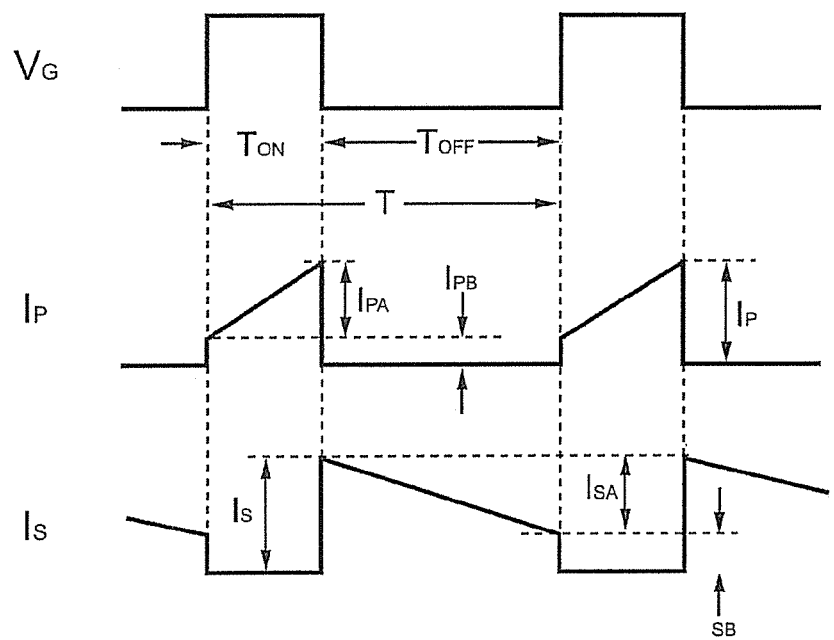
FIG. 2 illustrates key waveforms of the conventional power converter operating in continuous current mode.

Referring to FIG. 1, a power converter is illustrated. The power converter includes an inductive device 10, which is a transformer in an embodiment of the present invention, having a primary winding $N_P$ and a secondary winding $N_S$. In order to regulate an output current $I_O$ of the power converter, a control circuit 70 generates a switching signal $V_G$ to switch the transformer 10 via a transistor 20. A primary-side switching current $I_P$ is generated as the switching signal $V_G$ is enabled (turned on). Referring to FIG. 2, a peak value $I_{PA}$ of the primary-side switching current $I_P$ is given by, $$I_{PA} = \frac{V_{IN}}{L_P} \times T_{ON} \quad (1)$$

where $V_{IN}$ is an input voltage applied to the transformer 10, $L_P$ is an inductance of the primary winding $N_P$ of the transformer 10, $T_{ON}$ is an on-time of the switching signal $V_G$.

Once the switching signal $V_G$ is disabled (turned off), the energy stored in the transformer 10 will be delivered to the secondary side of the transformer 10 and an output of the power converter via a rectifier 40. A peak value $I_{SA}$ of a secondary-side switching current $I_S$ can be given by, $$I_{SA} = \frac{(V_O + V_F)}{L_S} \times T_{DS} \quad (2)$$

where $V_O$ is an output voltage of the power converter, $V_F$ is a forward voltage dropped across the rectifier 40, $L_S$ is a inductance of the secondary winding $N_S$ of the transformer 10, and $T_{DS}$ is a discharging time of the secondary-side switching current $I_S$ under discontinuous current mode.

The discontinuous current mode of the power converter features that the energy in the transformer 10 is fully released before the next switching cycle starts. The continuous current mode features that the energy in the transformer 10 is not fully released as the next switching cycle starts. FIG. 2 shows the waveforms of the power converter operating under continuous current mode. A peak value $I_{P(PEAK)}$ of the primary-side switching current $I_P$ under continuous current mode is given by, $$I_{P(PEAK)} = I_{PA} + I_{PB} \quad (4)$$

$$I_{PA} = \frac{V_{IN}}{L_P} \times T_{ON} \quad (5)$$

where $I_{PB}$ represents the energy stored in the transformer 10.

Once the switching signal $V_G$ is disabled, the energy stored in the transformer 10 will be delivered to the secondary side of the transformer 10. The secondary-side switching current $I_S$ is determined by the primary-side switching current $I_P$ and the winding turns of the transformer 10. A peak value $I_{S(PEAK)}$ of the secondary-side switching current $I_S$ can be given by, $$I_{S(PEAK)} = \frac{T_{NP}}{T_{NS}} \times I_{P(PEAK)} = \frac{T_{NP}}{T_{NS}} \times (I_{PA} + I_{PB}) \quad (6)$$

where $T_{NP}$ is the winding turns of the primary winding $N_P$ of the transformer 10; and $T_{NS}$ is the winding turns of the secondary winding $N_S$ of the transformer 10.

Referring to FIG. 1, a current-sense resistor 30 is coupled from a source of the transistor 20 to a ground reference for converting the switching current $I_P$ to a switching-current signal $V_S$ coupled to the control circuit 70.

Figure 3:
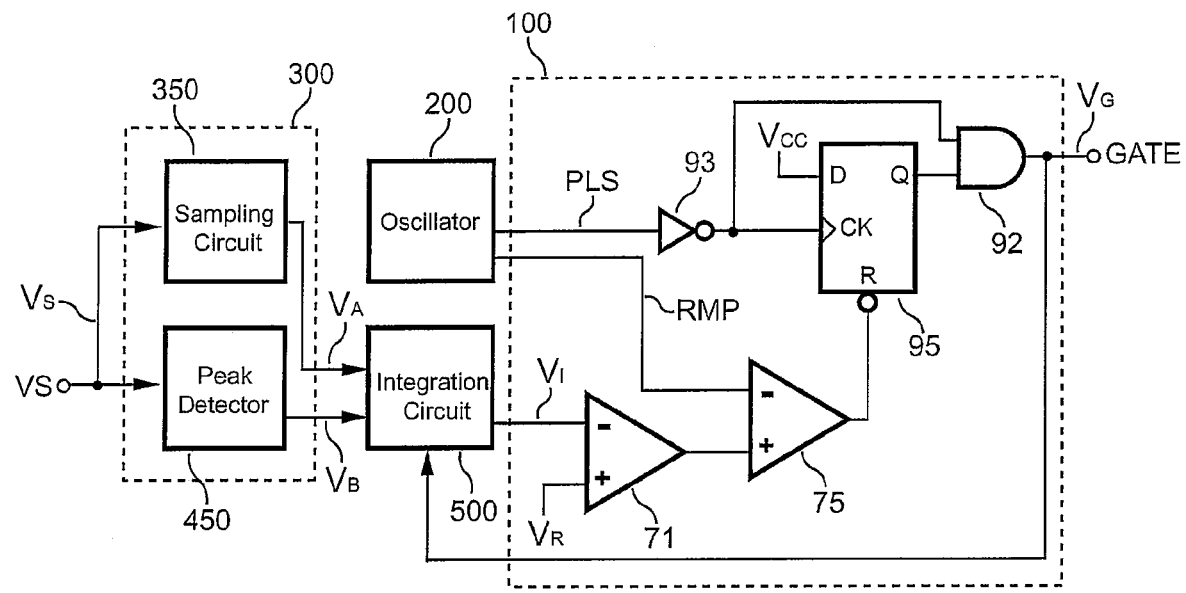
FIG. 3 illustrates a control circuit for measuring and regulating an output current of the power converter according to an embodiment of the present invention.

Referring to FIG. 3, a schematic diagram of the control circuit 70 according to an embodiment of the present invention is illustrated. A detection circuit 300 including a sampling circuit 350 and a peak detector 450 generates a continuous-current signal $V_A$ and a peak-current signal $V_B$ respectively by measuring the switching-current signal $V_S$. An oscillator 200 generates an oscillation signal PLS to determine the switching frequency of the switching signal $V_G$. An integration circuit 500 is used to generate an average-current signal $V_I$ by integrating the continuous-current signal $V_A$ and the peak-current signal $V_B$ with the off time $T_{OFF}$ of the switching signal $V_G$. The average-current signal $V_I$ is produced in response to the continuous-current signal $V_A$ and the peak-current signal $V_B$. A time constant of the integration circuit 500 is correlated with a switching period T of the switching signal $V_G$. The average-current signal $V_I$ is therefore proportional to the output current $I_O$ of the power converter.

A switching control circuit 100 includes an error amplifier 71 having a reference voltage $V_R$ for output current control. The switching control circuit 100 further includes a comparator 75 associated with a flip-flop 95, an inverter 93 and an AND gate 92 controlling the pulse width of the switching signal $V_G$ in response to an output of the error amplifier 71. The error amplifier 71 amplifies the average-current signal $V_I$ and provides a loop gain for output current control. A current control loop is formed from the detection of the primary-side switching current $I_P$ to the modulation of the pulse width of the switching signal $V_G$. The current control loop controls the magnitude of the primary-side switching current $I_P$ in accordance with the reference voltage $V_R$. The secondary-side switching current $I_S$ is a ratio of the primary-side switching current $I_P$ as shown in equation (6). Referring to the waveform in FIG. 3, the average of the secondary-side switching current $I_S$ represents the output current $I_O$ of the power converter. The output current $I_O$ of the power converter can be expressed by, $$I_O = \left(I_{SB} \times \frac{T_{OFF}}{T}\right) + \left(I_{SA} \times \frac{T_{OFF}}{2T}\right) \quad (7)$$

where $T_{OFF}$ represents the off time of the switching signal $V_G$ under continuous current mode. The output current $I_O$ of the power converter is therefore regulated.

The primary-side switching current $I_P$ is converted to the switching-current signal $V_S$ across the current-sense resistor 30. The detection circuit 300 detects the switching-current signal $V_S$ and generates the continuous-current signal $V_A$ and the peak-current signal $V_B$. The average-current signal $V_I$ is designed by, $$V_I = \left(V_A + \frac{V_B - V_A}{2}\right) \times \frac{T_{OFF}}{T_I} \quad (8)$$

where $$V_B = \frac{T_{NS}}{T_{NP}} \times R_S \times (I_{SA} + I_{SB}) \quad (9)$$

$$V_A = \frac{T_{NS}}{T_{NP}} \times R_S \times I_{SB} \quad (10)$$

where $T_I$ is the time constant of the integration circuit 500.

Referring to equations (7)-(10), the average-current signal $V_I$ can be rewritten as, $$V_I = \frac{T}{T_I} \times \frac{T_{NS}}{T_{NP}} \times R_S \times I_O \quad (11)$$

It is noted that the average-current signal $V_I$ is proportional to the output current $I_O$ of the power converter. The average-current signal $V_I$ increases whenever the output current $I_O$ increases. However, the maximum value of the average-current signal $V_I$ is limited to the value of the reference voltage $V_R$ through the regulation of the current control loop. Under feedback control of the current control loop, a maximum output current $I_{O(MAX)}$ is given by, $$I_{O(MAX)} = \frac{T_{NP}}{T_{NS}} \times \frac{G_A \times G_{SW} \times V_{R1}}{1 + \left(G_A \times G_{SW} \times \frac{R_S}{K}\right)} \quad (12)$$

where K is a constant equal to $T_I/T$, $V_{R1}$ is the value of the reference voltage $V_R$, $G_A$ is the gain of the error amplifier 71, and $G_{SW}$ is the gain of the switching circuit. If the loop gain of the current control loop is high ($G_A \times G_{SW} \gg 1$), the maximum output current $I_{O(MAX)}$ is given by, $$I_{O(MAX)} = K \times \frac{T_{NP}}{T_{NS}} \times \frac{V_{R1}}{R_S} \quad (13)$$

The maximum output current $I_{O(MAX)}$ of the power converter is thus regulated as a constant current in accordance with the reference voltage $V_R$.

The oscillation signal PLS sets the D flip-flop 95 via the inverter 93. An output of the D flip-flop 95 is coupled to a first input of the AND gate 92. A second input of the AND gate 92 is coupled to an output of the inverter 93. An output of the AND gate 92 generates the switching signal $V_G$. The D flip-flop 95 is reset by an output of the comparator 75. A positive input of the comparator 75 is coupled to an output of the error amplifier 71. A negative input of the comparator 75 is supplied with a ramp signal RMP that is provided by the oscillator 200. The output of the comparator 75 can reset the D flip-flop 95 for shortening the pulse width of the switching signal $V_G$ so as to regulate the output voltage $V_O$ and the output current $I_O$.

Figure 4:
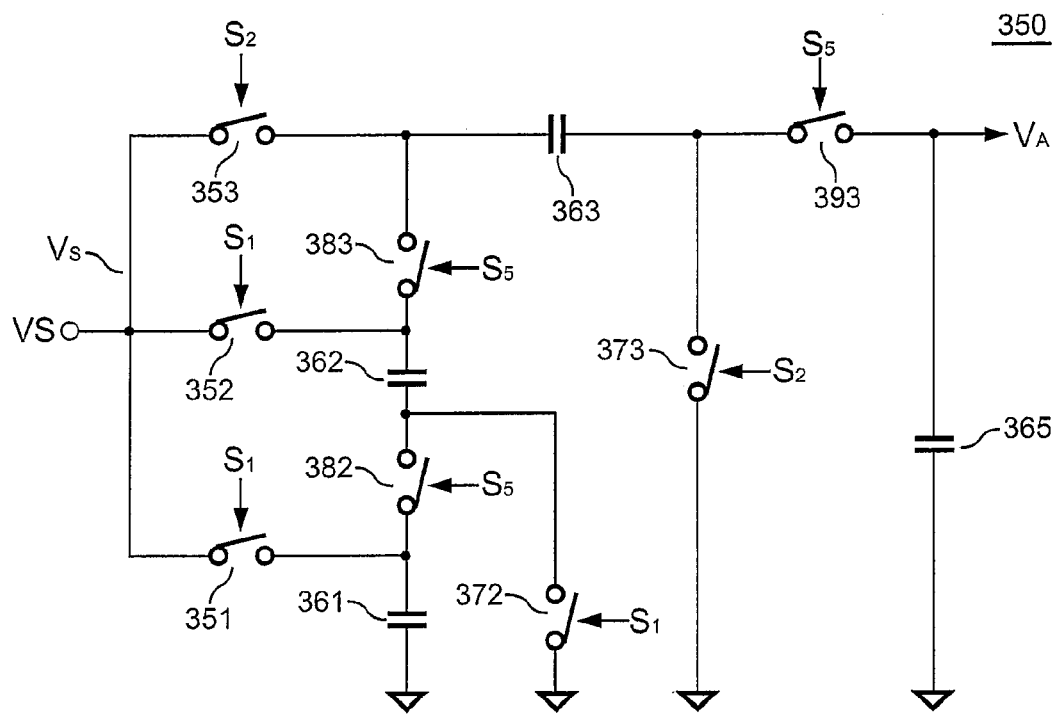
FIG. 4 illustrates a schematic circuit diagram of a sampling circuit according to an embodiment of the present invention.

FIG. 4 illustrates a schematic circuit diagram of the sampling circuit 350. Switches 351, 352 and 353 are coupled to receive the switching-current signal $V_S$. The switch 351 is connected to a first terminal of a capacitor 361. A second terminal of the capacitor 361 is connected to the ground reference. The switch 352 is connected to a first terminal of a capacitor 362. A second terminal of the capacitor 362 is connected to the ground reference via a switch 372. The capacitors 362 and 361 form a capacitor set. The switch 353 is connected to a first terminal of a first capacitor 363. A second terminal of the first capacitor 363 is connected to the ground reference via a switch 373. A switch 382 is connected in between the second terminal of the capacitor 362 and the first terminal of the capacitor 361. A switch 383 is connected in between the first terminal of the capacitor 362 and the first terminal of the first capacitor 363. A switch 393 is connected in between the second terminal of the first capacitor 363 and a first terminal of a second capacitor 365. A second terminal of the second capacitor 365 is connected to the ground reference. When the switching signal $V_G$ is enabled (turned on), the switches 351, 352 and 372 are controlled by a control signal $S_1$ for generating a first-sampled signal $V_1$ across the capacitors 361 and 362 during the first period. The switches 353 and 373 are controlled by a control signal $S_2$ for generating a second-sampled signal $V_2$ across the first capacitor 363. The switches 382, 383 and 393 are controlled by a control signal $S_5$ for generating the continuous-current signal $V_A$ in accordance with the first sampled-signal $V_1$ and the second-sampled signal $V_2$. The continuous-current signal $V_A$ can be shown by, $$V_A = V_1 - (V_2 - V_1)$$

$$V_A = (2 \times V_1) - V_2 \quad (14)$$

The continuous-current signal $V_A$ is proportional to the amplitude of the current $I_{PB}$ as shown in FIG. 2.

Figure 5:
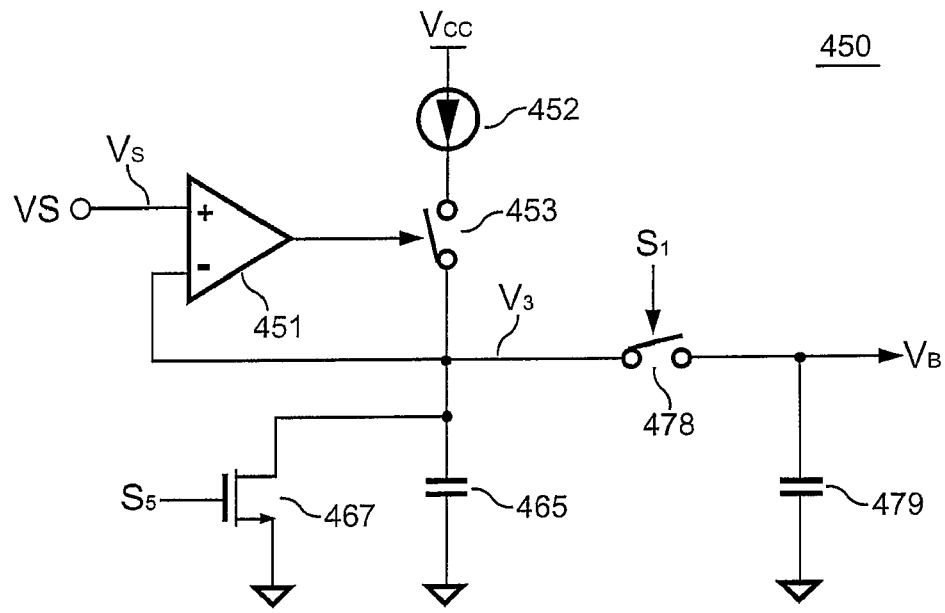
FIG. 5 illustrates a schematic circuit diagram of a peak detector according to an embodiment of the present invention.
Figure 6:
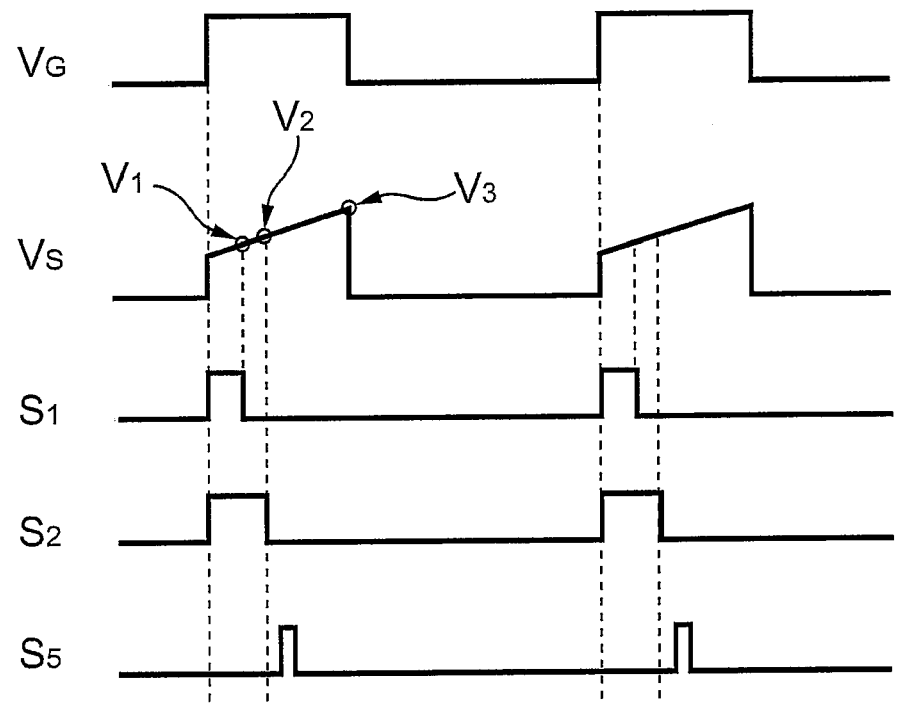
FIG. 6 illustrates waveforms of control signals of the sampling circuit according to an embodiment of the present invention.

FIG. 5 illustrates a schematic circuit diagram of the peak detector 450. A comparator 451 has a positive input coupled to receive the switching-current signal $V_S$. The amplitude of the switching-current signal $V_S$ is proportional to the amplitude of the primary-side switching current $I_P$. A capacitor 465 is used to hold the peak value of the switching-current signal $V_S$. A negative input of the comparator 451 is coupled to the capacitor 465. A constant current source 452 is applied to charge the capacitor 465. A switch 453 is coupled between the constant current source 452 and the capacitor 465. The switch 453 is turned on/off by an output of the comparator 451. A peak-voltage signal $V_3$ is thus generated across the capacitor 465. The peak-voltage signal $V_3$ is proportional to a sum current of $I_{PA}$ and $I_{PB}$ shown in FIG. 2. A transistor 467 is coupled in parallel with the capacitor 465 to discharge the capacitor 465. A switch 478 is used for periodically conducting the peak-voltage signal $V_3$ from the capacitor 465 to a capacitor 479. Then a peak-current signal $V_B$ is obtained across the capacitor 479. The waveforms of control signals $S_1$, $S_2$ and $S_5$ and signals $V_1$, $V_2$ and $V_3$ are shown in FIG. 6.

Figure 7:
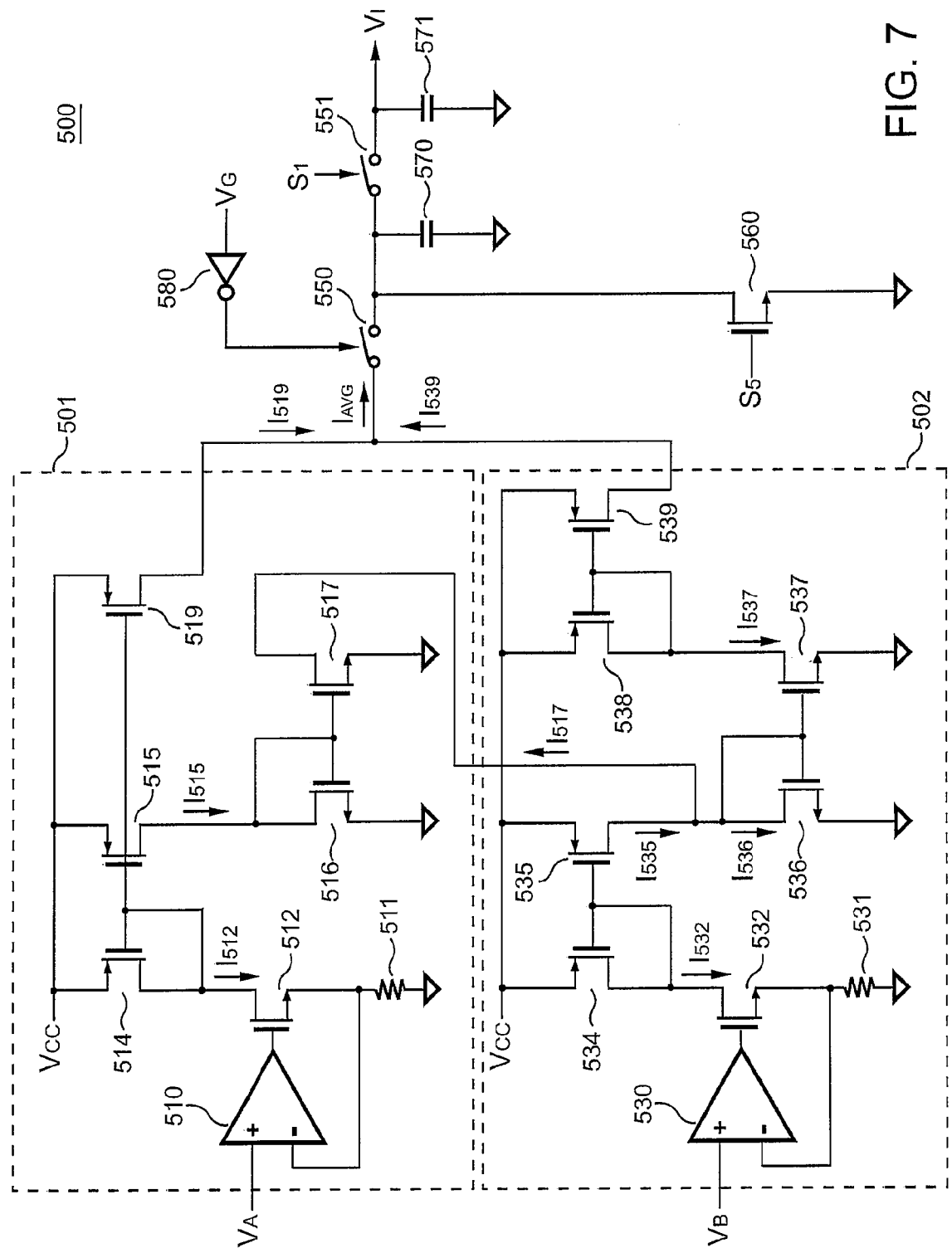
FIG. 7 illustrates a schematic circuit diagram of an integration circuit according to an embodiment of the present invention.

FIG. 7 illustrates a schematic circuit diagram of the integration circuit 500 according to an embodiment of the present invention. An operational amplifier 510, a resistor 511 and a transistor 512 construct a first V-to-I converter to generate a first programmable current $I_{512}$ in response to the voltage amplitude of the continuous-current signal $V_A$. Transistors 514, 515 and 519 form a first current mirror for producing a current $I_{515}$ and a first-charge current $I_{519}$ by mirroring the first programmable current $I_{512}$. Transistors 516 and 517 form a second current mirror for generating a current $I_{517}$ by mirroring the current $I_{515}$. The first V-to-I converter, the first current mirror, and the second current mirror form a first V-to-I circuit 501.

An operational amplifier 530, a resistor 531 and a transistor 532 form a second V-to-I converter for generating a second programmable current $I_{532}$ in response to the voltage amplitude of the peak-current signal $V_B$. Transistors 534 and 535 form a third current mirror for producing a current $I_{535}$ by mirroring the second programmable current $I_{532}$. Transistors 536 and 537 develop a fourth current mirror for producing a current $I_{537}$ in response to the current $I_{535}$ and the current $I_{517}$. The current $I_{536}$ can be expressed by, $$I_{536} = I_{535} - I_{517}$$

Since the geometric size of the transistor 536 is twice the size of the transistor 537, the amplitude of the current $I_{537}$ will be the amplitude of the current $I_{536}$ divided by 2. Transistors 538 and 539 form a fifth current mirror for generating a second-charge current $I_{539}$ by mirroring the current $I_{537}$. The second V-to-I converter, the third current mirror, the fourth current mirror, and the fifth current mirror form a second V-to-I circuit 502.

The drains of the transistor 519 and the transistor 539 are coupled together for generating an average signal $I_{AVG}$ by summing the first-charge current $I_{519}$ and the second-charge current $I_{539}$. The average signal $I_{AVG}$ can be expressed by, $$I_{AVG} = \frac{V_A}{R_{511}} + \frac{\left(\frac{V_B}{R_{531}} - \frac{V_A}{R_{511}}\right)}{2} \quad (15)$$

The resistor 511, the resistor 531 and a charge capacitor 570 determine the time constant of the integration circuit 500. The resistor 531 is correlated to the resistor 511. As the resistance of the resistor 531 is set to be equal to the resistance of the resistor 511, the equation (15) can be thus rewritten as, $$I_{AVG} = \frac{1}{R_{511}} \times \left(V_A + \frac{V_B - V_A}{2}\right) \quad (16)$$

An integrated switch 550 is coupled between the drain of the transistor 519 and the charge capacitor 570. The integrated switch 550 is turned on only during the off time $T_{OFF}$ period of the switching signal $V_G$. A transistor 560 is coupled in parallel with the charge capacitor 570 to discharge the charge capacitor 570. An output switch 551 serves to periodically conduct the voltage across the charge capacitor 570 to an output capacitor 571. The average-current signal $V_I$ is therefore obtained across the output capacitor 571.

$$V_I = \frac{1}{R_{511} C_{570}} \times \left(V_A + \frac{V_B - V_A}{2}\right) \times T_{OFF} \quad (17)$$

Figure 8:
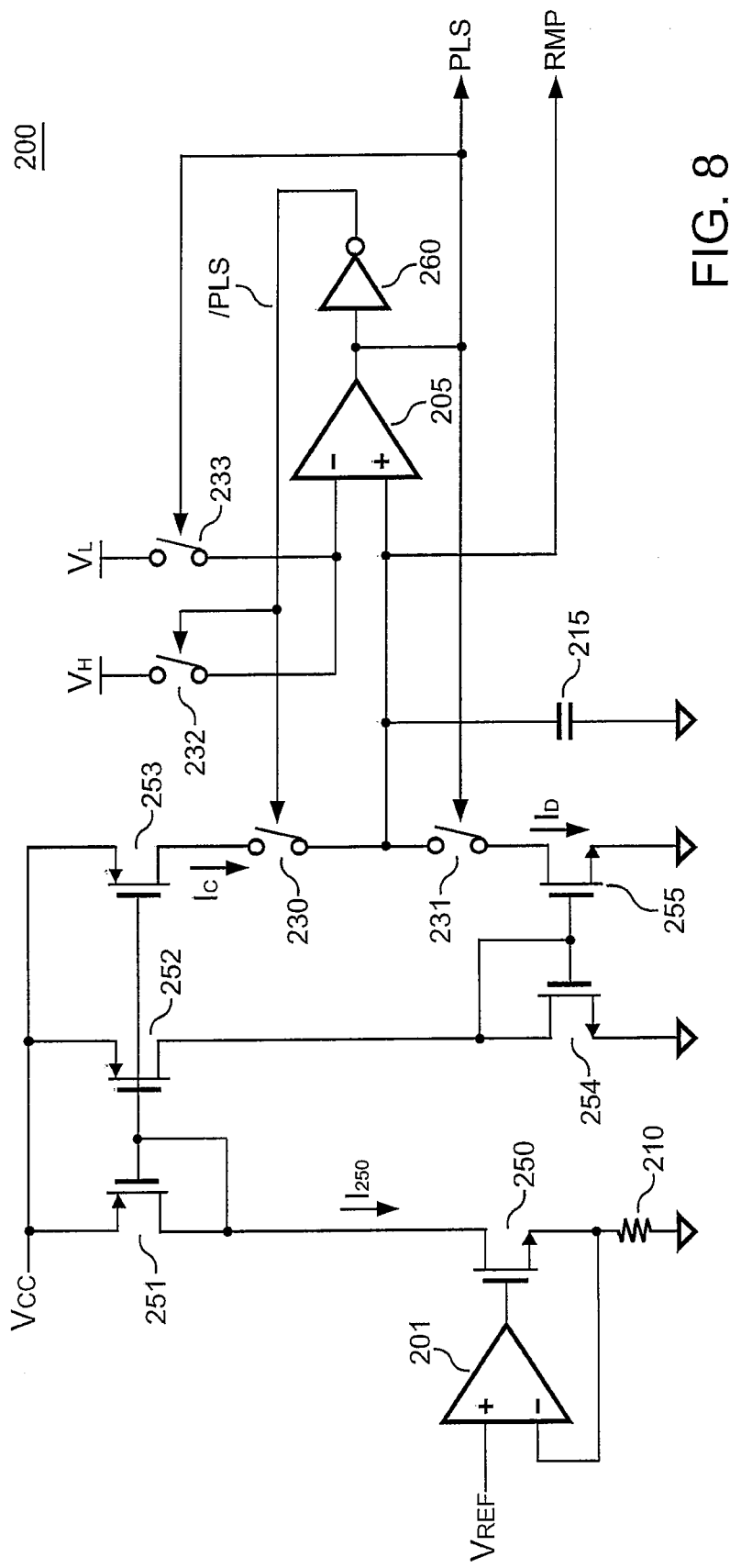
FIG. 8 illustrates a schematic circuit diagram of an oscillator according to an embodiment of the present invention.

FIG. 8 illustrates a schematic diagram of the oscillator 200 according to an embodiment of the present invention. An operational amplifier 201, a resistor 210 and a transistor 250 form a third V-to-I converter. The third V-to-I converter generates a reference current $I_{250}$ in response to a reference voltage $V_{REF}$. A plurality of transistors, such as 251, 252, 253, 254 and 255 form current mirrors for generating a charging current $I_C$ and a discharging current $I_D$ in accordance with the reference current $I_{250}$. A drain of the transistor 253 generates the charging current $I_C$. A drain of the transistor 255 draws the discharging current $I_D$. A switch 230 is coupled between the drain of the transistor 253 and a capacitor 215. A switch 231 is coupled between the drain of the transistor 255 and the capacitor 215. The ramp signal RMP is obtained across the capacitor 215. A comparator 205 has a positive input connected to the capacitor 215. The comparator 205 outputs an oscillation signal PLS. The oscillation signal PLS determines the switching frequency and turns on/off the switches 231 and 233. A first terminal of a switch 232 is supplied with a high-threshold voltage $V_H$. A first terminal of a switch 233 is supplied with a low-threshold voltage $V_L$. A second terminal of the switch 232 and a second terminal of the switch 233 are both coupled to a negative input of the comparator 205. An input of an inverter 260 is coupled to an output of the comparator 205 for generating an inverse oscillation signal /PLS. The inverse oscillation signal /PLS turns on/off the switch 230 and the switch 232. The resistance $R_{210}$ of the resistor 210 and the capacitance of the capacitor 215 determine the switching period T of the switching signal $V_G$.

$$T = \frac{C_{215} \times V_{OSC}}{V_{REF}/R_{210}} = R_{210} \times C_{215} \times \frac{V_{OSC}}{V_{REF}} \quad (18)$$

where $V_{OSC}=V_H-V_L$ and $C_{215}$ is the capacitance of the capacitor 215.

The average-current signal $V_I$ is correlated to the secondary-side switching current $I_S$ and the output current $I_O$ of the power converter. Thus, the equation (11) can be rewritten as, $$V_I = m \times \frac{T_{NS}}{T_{NP}} \times R_S \times I_O \quad (19)$$

where $T_{NP}$ is the turns of the primary winding $N_P$, $T_{NS}$ is the turns of the secondary winding $N_P$, and m is a constant, which can be determined by, $$m = \frac{R_{210} \times C_{215}}{R_{511} \times C_{570}} \times \frac{V_{OSC}}{V_{REF}} \quad (20)$$

The resistance $R_{511}$ of the resistor 511 is correlated to the resistance $R_{210}$ of the resistor 210. The capacitance $C_{570}$ of the charge capacitor 570 is correlated to the capacitance $C_{215}$ of the capacitor 215. Therefore, the average-current signal $V_I$ will be proportional to the output current $I_O$ of the power converter.

It will be apparent to those skilled in the art that various modifications and variations can be made to the structure of the present invention without departing from the scope or spirit of the invention. In view of the foregoing, it is intended that the present invention covers modifications and variations of this invention provided they fall within the scope of the following claims and their equivalents.

What is claimed is:

1. A control circuit, for measuring and controlling an output current of a power converter, said control circuit comprising:
   a detection circuit, for generating a continuous-current signal and a peak-current signal by detecting a switching-current signal of a transformer;
   an integration circuit, for generating an average-current signal in response to said continuous-current signal, said peak-current signal and an off time of a switching signal, wherein integration circuit comprises:
   a first V-to-I circuit, for generating a first-charge current in response to said continuous-current signal;
   a second V-to-I circuit, for generating a second-charge current in response to said peak-current signal;
   a charge capacitor; and
   an integrated switch, coupled to charge said charge capacitor using said first-charge current signal and said second-charge current signal when said switching signal is disabled; and
   a switching control circuit, for generating said switching signal in response to said average-current signal, wherein said switching signal is coupled to switch said transformer and regulate said output current of said power converter.

2. The control circuit as claimed in claim 1, further comprising an oscillator to generate an oscillation signal for determining a switching frequency of said switching signal.

3. The control circuit as claimed in claim 1, a time constant of said integration circuit being correlated with a switching period of said switching signal.

4. The control circuit as claimed in claim 1, said detection circuit comprising:
   a sampling circuit, for generating said continuous-current signal by measuring a continuous current of said switching-current signal; and
   a peak detector, for generating said peak-current signal by measuring a peak value of said switching-current signal.

5. The control circuit as claimed in claim 1, said integration circuit comprising:
   an output capacitor, for generating said average-current signal; and
   an output switch, for periodically conducting a voltage across said charge capacitor to said output capacitor.

6. The control circuit as claimed in claim 4, said sampling circuit comprising:
   a capacitor set, coupled to receive said switching-current signal of said transformer for generating a first-sampled signal at a first period when said switching signal is enabled;
   a first capacitor, coupled to receive said switching-current signal of said transformer for generating a second-sampled signal at a second period when said switching signal is enabled; and
   a second capacitor, coupled to said capacitor set and said first capacitor for generating said continuous-current signal in accordance with said first-sampled signal and said second-sampled signal.

7. A method for measuring and controlling an output current of a power converter, comprising the steps of:
   generating a continuous-current signal and a peak-current signal by a detection of a switching current of an inductive device;
   generating an average-current signal by an integration of said continuous-current signal, said peak-current signal with an off time of a switching signal;
   generating a first-charge current in response to said continuous-current signal;
   generating a second-charge current in response to said peak-current signal;
   charging a charge capacitor using said first-charge current signal and said second-charge current signal when said switching signal is disabled; and
   generating said switching signal in response to said average-current signal; wherein said switching signal is coupled to switch said inductive device of said power converter.

8. The method as claimed in claim 7, further comprising a step of generating an oscillation signal for determining a switching frequency of said switching signal.

9. The method as claimed in claim 7, a time constant of said integration being correlated with a switching period of said switching signal.

10. The method as claimed in claim 7, said detection of said switching-current signal of said inductive device, comprising:

generating said continuous-current signal by sampling a continuous current of said switching-current signal; and generating said peak-current signal by detecting a peak current of said switching-current signal.

11. The method as claimed in claim 7, said integration comprising:

periodically conducting a voltage across said charge capacitor to an output capacitor for generating said average-current signal.

12. The method as claimed in claim 10, said sampling of a continuous current of said switching-current signal, comprising:

conducting a first-sampled signal to a capacitor set at a first period when said switching signal is enabled;

conducting a second-sampled signal to a first capacitor at a second period when said switching signal is enabled; and forming said continuous-current signal across a second capacitor in accordance with said first-sampled signal and said second-sampled signal.

* * * * *